Dec. 27, 1949 N. SWINDIN 2,492,333
APPARATUS FOR CONTINUOUSLY PURIFYING AND
CONCENTRATING ACID PICKLING LIQUORS
Filed July 1, 1946 4 Sheets-Sheet 1

Inventor
Norman Swindin
By
Attorneys

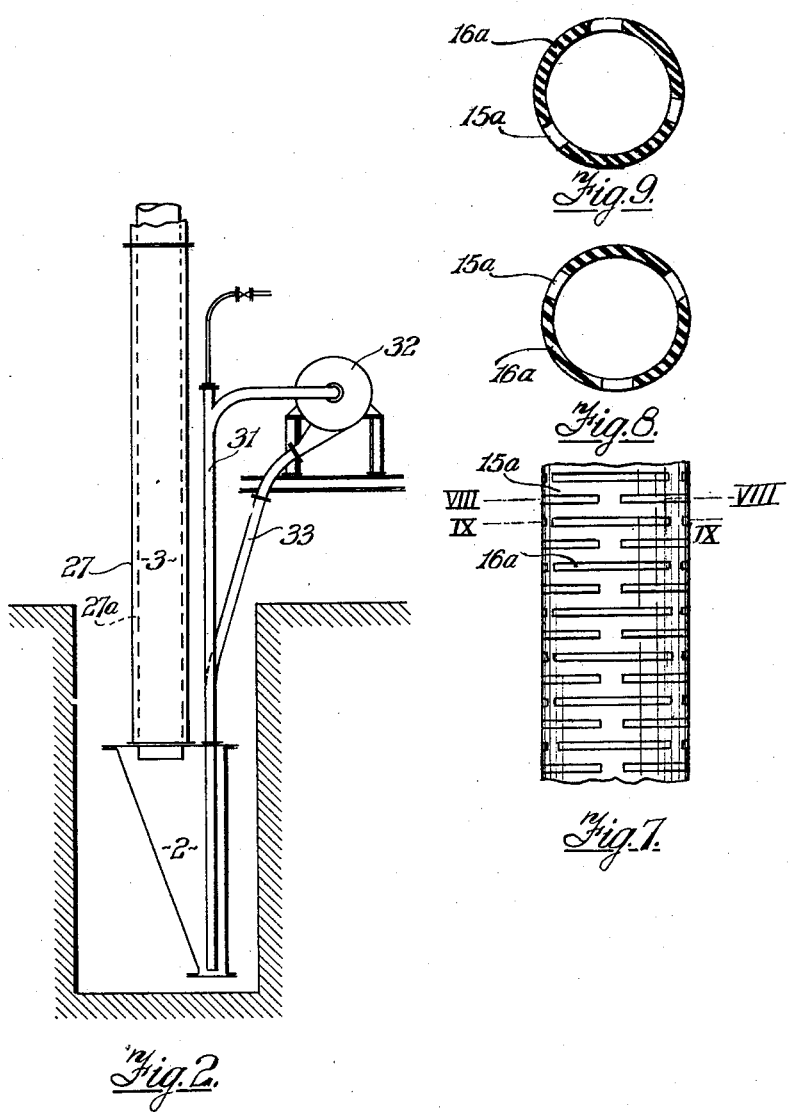

Dec. 27, 1949  N. SWINDIN  2,492,333
APPARATUS FOR CONTINUOUSLY PURIFYING AND
CONCENTRATING ACID PICKLING LIQUORS
Filed July 1, 1946  4 Sheets-Sheet 3
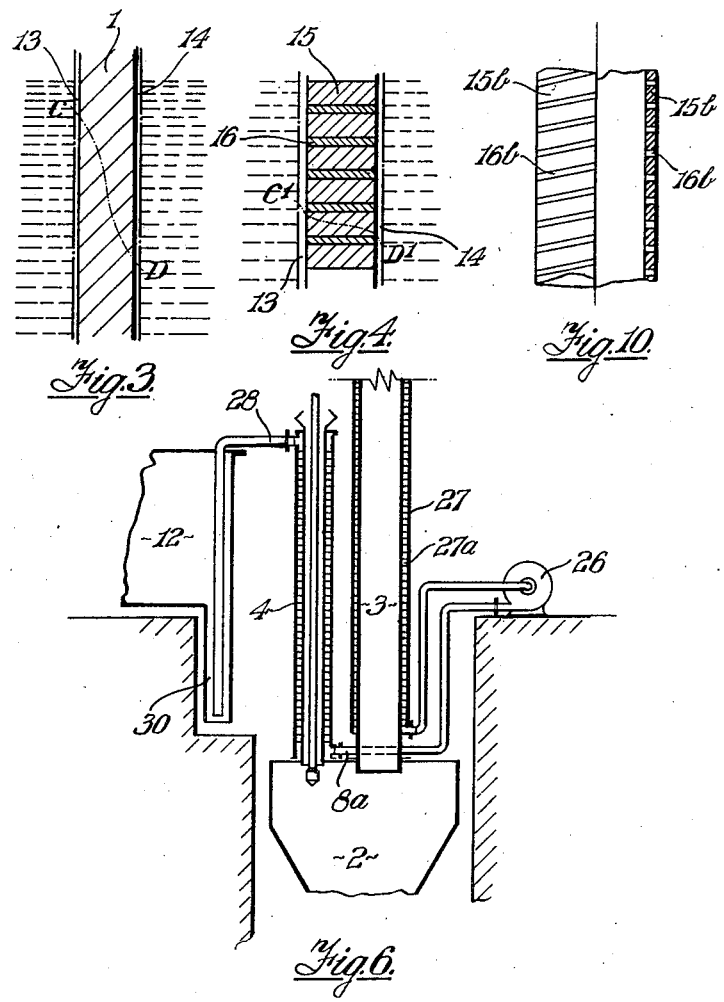

Patented Dec. 27, 1949

2,492,333

UNITED STATES PATENT OFFICE 2,492,333

APPARATUS FOR CONTINUOUSLY PURIFYING AND CONCENTRATING ACID PICKLING LIQUORS

Norman Swindin, London, England

Application July 1, 1946, Serial No. 680,792
In Great Britain May 15, 1945

8 Claims. (Cl. 23—273)

1

This invention relates to a process of, and means for, continuously purifying and concentrating iron pickle liquors such as contain sulphuric acid and hydrochloric acid and has for its object inter alia the elimination of hydrous ferrous sulphate in crystal form by progressively cooling said liquors, the said cooling process being carried out in such a manner that a large proportion of the heat abstracted during cooling is finally restored to the regenerated liquor from which the crystalline matter has been removed.

It is known that if a hot pickling solution containing sulphuric acid or sulphuric and hydrochloric acid employed for descaling iron sheet or the like is cooled, the ferrous sulphate dissolved therein crystallises out of the solution and in this state can be removed by mechanical separation.

According to the invention, there is provided a process for continuously purifying and concentrating spent hot sulphuric acid iron pickling liquors with removal of copperas therefrom and the addition of the required fresh sulphuric acid thereto, which consists in first subjecting said spent pickling liquors to one stage of cooling in a regenerative heat exchange apparatus to crystallise and precipitate said copperas and then subjecting the liquor from said first stage to a second stage of cooling with evaporation of water vapor therefrom under vacuum in a second regenerative heat exchange apparatus to further crystallise and precipitate copperas therefrom, the water vapor evaporated in said second stage being absorbed by concentrated sulphuric acid and returned to the spent liquors entering said first stage and the liquor purified and concentrated in said second stage being caused to flow successively through said second and said first regenerative heat exchange apparatus in a direction counter to that of the spent pickling liquor, the copperas crystallised and precipitated from said liquors being continuously or intermittently collected and removed therefrom.

The invention also provides an apparatus for carrying out the aforesaid process for continuously purifying and concentrating iron pickle liquors in which a plurality of open topped vertical tubes are adapted to be fed with spent pickling liquor from a storage tank and are connected at their bases to a sealed settling tank from which extends a vertical barometric column, the head of which is connected to a vacuum pump so as to draw liquor from said tank up said column to overflow the top thereof, said open topped tubes and said barometric tube being

2 enclosed by external jackets, interconnected at their lower ends externally of said tank between which and the said open topped and barometric tubes there are formed passages through which the liquors overflowing said barometric tube are successively pumped or caused to flow under gravity in a direction counter to the liquors in said open topped and barometric tubes.

The said vacuum pump is connected to the barometric column through an acid spray chamber at the top of which concentrated sulphuric acid is introduced and at the bottom of which is introduced the water vapor evaporated under vacuum from the pickling liquor in the barometric columns, the acid being returned, after absorption of said water vapor to said open topped vertical tubes.

Preferably the said passages between the open topped and barometric tubes and their respective jackets are formed to provide a helical passage for the liquor around said tubes.

An air lift or like apparatus is connected to the bottom of the settling tank to remove the precipitated crystals therefrom, the filtrate from such operation being returned to the settling tank.

Reference will now be made to the accompanying drawings illustrating preferred forms of construction of the apparatus provided according to the present invention and in which:

Figure 2 is a side elevation of Figure 1 showing an air lift and crystal filtration apparatus.

Figures 3 and 4 are diagrams illustrating the flow of heat through the wall of a tube on either side of which liquid is flowing.

Figure 5:
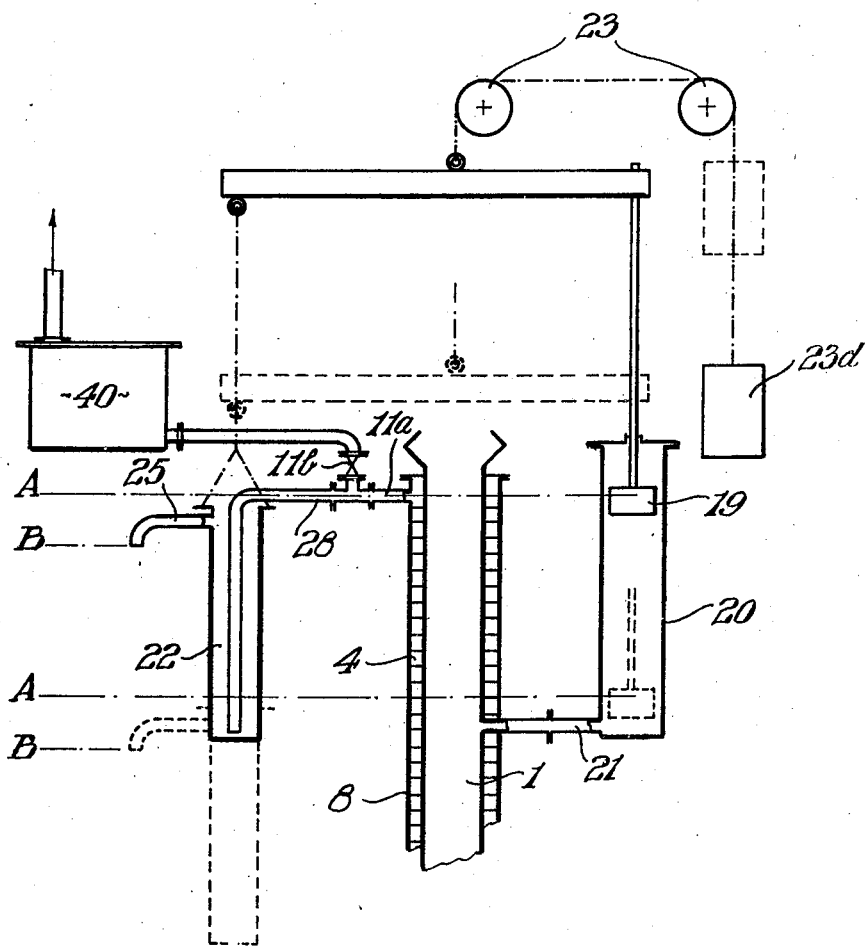

Figure 5 is a sectional elevation of a means for automatically making adjustments for variations in barometric pressure, Figure 6 is a sectional elevation of the apparatus according to the invention provided with means for pumping the purified liquors to a storage tank, Figure 7 is an outside elevation showing the construction of a tube used in the apparatus according to the invention, Figures 8 and 9 are sections on the lines VIII—VIII and IX—IX respectively of Figure 7, and Figure 10 is an outside and sectional elevation of a modified form of construction of a tube used on the purifying and concentrating apparatus.

The regenerative cooling is carried out in a series of vertical tubes I whose upper ends are open to atmosphere but whose lower ends depend into or terminate under a seal at a cover of an acid pickling liquor and settling tank 2 common to the number of vertical tubes employed and also to a vertical column 3 hereinafter called the barometric column. Each tube 1 is provided with a stirring device comprising a vertically disposed motor 6 driving a vertical shaft 5 extending within the tube 1 and carrying a series of vanes, 5a, extending full length of the tubes 1, and wiping against the wall of the said tubes, the lower end of said shaft entering the settling tank 2 and carrying a weight 7. Each tube 1 is enclosed by a jacket 8 between the inner wall of which and the outer wall of the tube 1 there is provided a helical passage 4 to promote intimate contact between the liquor and wall of tubes 1, the lower ends of all the passages 4 communicating with an independent regenerated liquor system as described hereafter. The outlets 11 at the top of the passages 4 go by a common duct 11a to a siphon pipe 28 depending within a sump 30 of a regenerated acid liquor tank 12. The action of the internal stirring devices, 5, 5a, is to cause the hot liquid to have an angular velocity with respect to the inner surface of the tubes 1 to increase the rate of transmission of heat therethrough and reheat cooled regenerated liquor which is passed upwards through the helical passages 4. It is important that the walls of tubes 1 be constructed in such a manner that heat will flow across the walls thereof and not axially along the said walls. Regeneration of the sensible heat in the pickle liquor consists essentially of arranging the flow of the liquids—one being cooled and the other being heated—so that the temperature difference between the inner and outer surface of the tube 1 at any cross-section thereof shall be a minimum. Figure 3 shows diagrammatically the manner of heat flow across the walls of the tube 1. It is known that the chief resistance to the flow of heat across the walls of a tube so placed that a hotter fluid flows against one side of the wall and a colder liquid flows on the other side of the wall is offered by static films of each fluid, indicated at 13 and 14 in Figure 3 which is a cross section of a wall of the tube 1. The design of heat transmission apparatus is concerned with the partial removal of these films. To attain this end the fluids are caused to flow at high velocities or the tube may be rotated at the desired speed, or a revolving stirrer may be used as described according to the present invention. In the case of regeneration of sensible heat of a hot fluid required to be cooled the efficiency of the recovery of this heat depends on the difference of temperature between the two sides of the wall of the tube 1, the smaller the difference the higher being the efficiency. Referring again to Figure 3, it can be seen that the films 13 on the hotter side and 14 on the colder side of the tube wall blanket the flow of heat, i. e. film 13 prevents the heat entering the tube wall and film 14 prevents the heat leaving. As the metal of the tube conducts heat much quicker than the films of fluid, it follows therefore that any heat that passes through film 13 tends to flow along the tube wall, as indicated by line C—D Figure 3. As it is desirable to keep the tubes as short as possible, and as one end of the tube is hot and the other must be cold any flow of heat along the tube defeats this object. One of the objects of this invention is to construct a tube to prevent this axial flow of heat along the walls. Figure 4 shows a wall of the tube constructed of rings of metal 15 separated by rings of an adherent insulating material such as rubber or ebonite 16 the heat flow being indicated by the line C'—D'. The object could be obtained by using a very thin walled tube, but this is usually impracticable. According to the invention, as shown in Figures 7, 8 and 9, the axial heat flow may also be prevented by using a tube, the metal wall 15a of which is slit transversely at 16a, the slits being in staggered relationship vertically, and filled with an adhering rubber or rubber-like composition so that the tube does not leak or is a galvanic couple formed in the wall of the tube. Alternatively, the said tubes are constructed, as shown in Figure 10, as a helical metal winding 15b along a former, the interstices of the helical winding being filled with rubber, ebonite, vulcanite or like acid resisting material 16b capable of being made adherent to a metallic wall.

Figure 1:
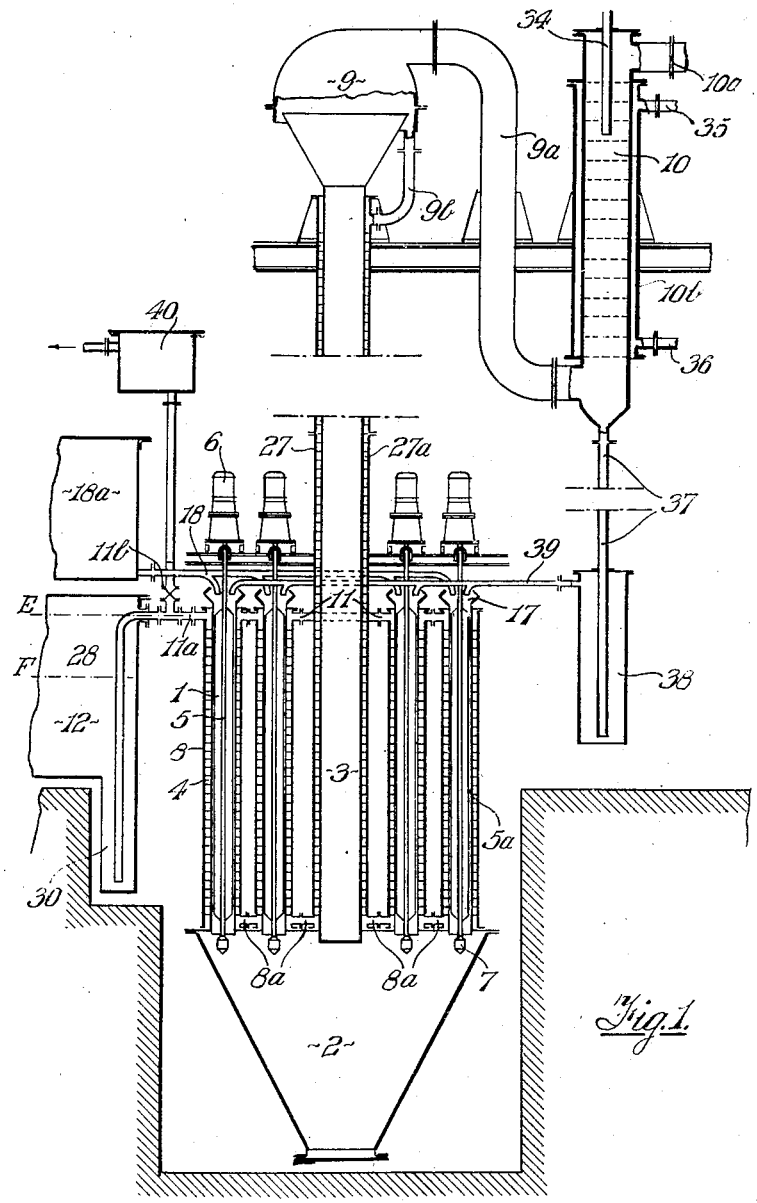
Figure 1 is a front sectional elevation of a plant for purifying and concentrating pickling liquors.

Referring again to Figure 1, the internal wall of the tube jacket 8 is lined with rubber or ebonite to prevent the axial flow of heat along it. In addition, its outer surface is suitably lagged so as to preserve the heat in the jacket liquor. An open funnel 17 is formed at the upper extremity of each tube 1 which is adapted to receive under controlled flow by the branched pipe 18, the spent acid pickle liquor from a container 18a. The settling tank 2 below the regenerative cooler tubes 1 carries preferably in a central position in relation to the cooling tubes 1 an ascending barometric column 3 similarly enclosed by a jacket 27 between which and the column 3 is provided a helical passage 27a which is connected to the passages 4 by passages 8a. The column 3 is of sufficient height to provide a barometric column to the limit of known atmospheric pressure. The barometric column 3 is of similar construction to the tubes 1 and terminates within a vacuum head 9, in the base of which a pipe 9b conveys liquor overflowing the top of the column 3 to the helical passage 27a. The vacuum head is coupled by conduit 9a to a vertical condensing column 10 in the top of which is sealed a pipe 34 through which sulphuric acid may be continuously delivered in spray form, said acid absorbing thereby the water vapor evolved under vacuum from the liquor from column 3. The condensing column 10 is connected to a vacuum pump (not shown), by conduit 10a, and is enclosed by a jacket 10b, water for cooling the mixture of acid and vapor being arranged to flow into the annular space between the condensing column 10 and jacket 10b from an inlet pipe 35 and out at an outlet pipe 36. At the base of the condensing column 10 there is connected an acid outlet pipe 37, which extends through the top of a closed container 38 for receiving the acid from the condensing column 10 and which has an outlet pipe 39 arranged to deliver acid from the container 38 into the to of the tubes 1. The distance between the top of the container 38 and the vacuum pump is such that it exceeds the greatest head of acid which will be maintained in the pipe 37 and column 10 at the lowest atmospheric pressure, so that discharge of acid from the condensing column 10 will always be maintained.

Figure 2 shows the provision of an air lift 31 sealed into the sludge tank 2 the lower end of which is preferably formed, as shown, with downwardly converging sides to facilitate the accumulation therein of copperas crystals and other solid or partly crystalline matter. The air lift 31 delivers the said material to a filter 32, the filtrate therefrom being returned through a pipe 33 to the tank 2.

The effective height of the liquor in the barometric column 3, that is, the difference between the level of liquor in the open topped tubes 1 and that of the liquor overflowing from the top of the column 3 within the vacuum head 9, will vary according to the atmospheric pressure obtaining at any given time and provision must be made for this variation since the apparatus is designed to be able to work continuously. In the form of construction according to Figure 1 this is effected by the provision of a priming cock 11b connected to the pipe 11a connected to a vacuum pump through a catch pot 40 so that air may be withdrawn from the siphon system formed by the pipes 28, 11a and the upper portion of the helical passage 4 in tubes 1. The end of the pipe 28 is sealed by the liquor in the sump 30 formed in the tank 12.

In the modification of the apparatus according to the invention shown in Figure 5, a float 19 operates in a tank 20 adjacent to and connected with the tube 1 by a connection 21 approximately 3 feet from the top of the tube 1, that is, so that the connection 21 will always be slightly below the lowest level of liquor in the tube 1 when the atmospheric pressure is at a maximum. The float 19 is rigidly attached to a siphon vessel 22 and counter-balanced by a system of pulleys 23 and weight 23d. The siphon pipe 28 discharges liquor from the passages 4 into the siphon vessel 22 which in turn discharges into the regenerated liquor tank through an outlet pipe 25.

A further method of accommodating the system to variations in atmospheric pressure is shown in Figure 6 where a pump 26 receives the liquor from the bottom of passage 27a of the barometric column 3 and delivers it under the required pressure to the passages 4 of the tubes 1 through the passages 8a connecting the jackets 8.

The operation of the process and apparatus is as follows:

The hot spent acid pickle liquor is delivered under controlled flow from the tank 18a through the pipe 18 to the interior of the open topped tubes 1 and is given angular velocity by the blades 5a of the shafts 5 driven by the motors 6. Under the action of the vacuum pump connected to the conduit 10a the spent liquor is drawn down the tubes 1 into the settling tank 2. From the tank 2 the liquor is drawn up the barometric tube 3 at the top of which it overflows into the vacuum head 9 and passes through the pipe 9b to descend through the helical passage 27a between the column 3 and jacket 27. As the liquor overflows within the vacuum head 9 water vapor is evaporated from the liquor under the action of the vacuum and a considerable degree of cooling is thereby produced in the said liquor. This cooled liquor in descending through the passage 27a progressively cools, by heat exchange, the liquor ascending in the column 3 and is at the same time itself progressively heated in descent. At the base of the barometric column 3 the liquor passes through passages 8a and ascends the helical passages 4 between the jackets 8 and the tubes 1 and by the same action of heat exchange progressively cools the hot spent liquor descending within the tubes 1, and is itself progressively heated until it is discharged through the pipes 11, 11a and the siphon pipe 28 into the regenerated liquor tank 12.

In this way the spent liquor is cooled as it descends through tubes 1 into the settling tank 2 and as a result copperas crystallizes out and settles in the bottom of the tank 2. The liquor is further cooled by heat exchange and evaporation in the barometric column 3 and this may produce further formation of copperas crystals which will also be deposited in the tank 2. Thus the cold liquor descending the helical passage 27a is regenerated pickle liquor freed from copperas and concentrated by evaporation in the vacuum head 9, and is progressively warmed until discharged into the regenerated liquor tank 12.

The water vapor evolved within the vacuum head 9 is drawn through the conduit 9a into the condensing column 10 where it is absorbed by the acid spray descending from pipe 34 and passes down pipe 37 into the container 38, from which it flows through pipe 39 to be added to the spent liquor entering tubes 1. The absorption of evaporated water vapor produces further evaporation and cooling of the liquor in the column 3.

The copperas and other material collecting in the base of the settling tank 2 is progressively removed by the air lift 31, or any other suitable means and filtered in the filter 32, the filtrate being returned to the tank 2 through the pipe 33.

The cooling water used to dissipate the heat arising from the absorption of water vapor by the concentrated acid in the condensing column 10 may be used as a warm water make up to be added to the regenerated liquor to compensate for the loss of water content therein to the copperas in the form of water of crystallisation.

If the level of liquor in the passages 4 is below the pipe 11a then the air in this pipe must be exhausted through the priming cock 11b to start the siphon pipe 28 siphoning all regenerated liquor into the tank 12. Once started, the siphon action will be continuous provided the level of regenerated liquor in the tank 12 is below the liquor level in the tubes 1. To this end, the regenerated liquor tank is made of a depth sufficient to accommodate a filling of liquor from the storage tank 18a whilst leaving above the level of the liquor a space E—F equal in height to the difference in level of the liquor in tubes 1 between maximum and minimum atmospheric pressure. During continuous operation the storage tank 18a will be continuously replenished with spent liquor whilst regenerated liquor will be continuously withdrawn from the tank 12. Alternatively, as shown in Figure 6 a pump 26 may be provided to initiate the siphon action and the flow may then be controlled by manual or automatic adjustment of the pumping pressure in accordance with atmospheric variations and as dictated by local requirements. By this means adjustment may also be made to compensate for variations in the specific gravity of the liquor.

In the form of construction shown in Figure 5 the rate of flow of regenerated liquor into the tank 12 is automatically adjusted by means of the float 19 which moves up and down with the liquor level in tube 1 moving with it the siphon vessel 22 and thus adjusting the head of liquor A—B in the siphon pipe 28, and the rate of discharge from the siphon vessel into the tank 12, according to atmospheric pressure variations.

In this case again, to ensure continuous operation the level of regenerated liquor in tank 12 must be maintained below that of the spent liquor in tubes 1.

As an illustration of the operation and assuming the incoming hot liquor to be in the neighbourhood of 80° C. cooling will take place in the primary tubes 1 with a deposit of crystalline matter, i. e., copperas, which falls into the settling tank 2, the pickle liquor then ascends the vacuum column 3 and if further cooled, the temperature towards the top of the colmn 3 being in the neighbourhood of 0° C. The then cooled overflow liquor at this temperature in traversing the helical passage 27a and 4 of the barometric column 3 and the tubes 1, finally emerges to the regenerated liquor tank 12 at a temperature of between 55° to 60° C. During the whole of the cooling period the crystals or crystalline sludge formed are free to fall by gravity into the common sludge tank 2. Hence the regenerated liquor in a clear and usable form is available, the slightly diluted sulphuric acid used for the purposes of refrigeration may be introduced to the vertical tubes as described or else sent direct to the regenerated liquor tank, and an automatic make up supply is, or may be thus assured.

According to the invention the pickle may be made up according to any desired specification. Thus it may have an addition of hydrochloric acid or hydrofluoric acid. In the latter case all parts of the apparatus must be lined with rubber.

According to the foregoing method and means of regenerating spent pickle liquors the process is automatic and continuous. It has a low first capital cost and this applies even if the size of the unit is small; the running costs are low; little or no water is required except that used for absorbing the heat from the sulphuric acid, whilst the heat latent in the raw liquor is employed in the maximum degree for re-heating the regenerated liquor.

I claim:

1. Apparatus for the continuous purification and concentration of spent hot sulphuric acid iron pickling liquors with the removal of copperas therefrom and the addition of the required fresh sulphuric acid thereto, comprising a plurality of open topped tubes, means for feeding spent pickling liquor to said tubes, a sealed settling tank to which said tubes are connected at their bases, a vertical barometric column extending upwardly from the settling tank, a vacuum pump connected to the head of the barometric column and operative to draw liquor from said tank up said column and to overflow the top thereof, external jackets enclosing said open topped tubes and said barometric column and having means interconnecting their lower ends externally of said tank, passages being provided between said jackets and said open topped tubes and barometric column for the flow of liquors overflowing the barometric column in a direction counter to the direction of flow of the liquors in the open topped tubes and barometric column.

2. Apparatus as defined in claim 1, including an acid spray chamber, a vacuum pump connected to said barometric column through said spray chamber, means for introducing concentrated sulphuric acid at the top of said spray chamber, means for introducing at the bottom of the spray chamber the water vapor evaporated from the pickling liquor in the barometric column, and means for returning the acid, after absorption of said water vapor, to said open topped tubes.

3. Apparatus as defined in claim 1, wherein said passages between the open topped tubes and said barometric column and their respective jackets are provided with means forming a helical path for the liquors around said tubes and column.

4. Apparatus as defined in claim 1, wherein said barometric column and open topped tubes each comprises portions which are spaced axially and are separated by heat insulating material to hinder the axial flow of heat but assist the flow of heat radially therethrough, and including linings interiorly of and lagging externally of said jackets to prevent loss of heat therefrom.

5. Apparatus as defined in claim 1, wherein each of said tubes comprises a series of metal rings, and rings of an adherent insulating and acid resisting material.

6. Apparatus as defined in claim 1, wherein each of said tubes comprises helical metal strips having interstices, and an adherent strip of insulating and acid resisting material filling said interstices.

7. Apparatus as defined in claim 1, wherein the walls of said tubes are formed with transverse slits, and said slits are in staggered relationship vertically, and an adherent insulating and acid resisting material filling said slits.

8. Apparatus as defined in claim 1, including means to vary the rate of discharge of purified liquor from said open topped tubes in accordance with variations in the head of liquor in said barometric column due to changes in atmospheric pressure.

NORMAN SWINDIN.

REFERENCES CITED

The following references are of record in the file of this patent:

UNITED STATES PATENTS

| Number | Name | Date |
|---|---|---|
| 640,026 | Ramage | Dec. 26, 1899 |
| 1,256,068 | Sommer | Feb. 12, 1918 |
| 1,676,277 | Mumford | July 10, 1928 |
| 1,799,127 | Schlumbohm | Mar. 31, 1931 |
| 1,865,614 | Caldwell | July 5, 1932 |
| 2,017,773 | Smith et al. | Oct. 15, 1935 |
| 2,322,134 | Hodge | June 15, 1943 |